United States Patent [19]
Lennert

[11] Patent Number: 6,113,494
[45] Date of Patent: Sep. 5, 2000

[54] USING MULTIPLE PRIORITIZED STATEMENTS OF ABSTRACTED INTENTION TO ALIGN DIFFERENT VIEWS

[75] Inventor: David C. Lennert, Portland, Oreg.

[73] Assignee: Intel Corporation, Santa Clara, Calif.

[21] Appl. No.: 08/877,249

[22] Filed: Jun. 17, 1997

[51] Int. Cl.[7] ........................................... A63F 9/22
[52] U.S. Cl. .......................... 463/31; 463/33; 463/41
[58] Field of Search ................................ 463/30, 31, 32, 463/33, 40, 41, 42; 395/200.33, 200.37, 200.61; 701/23, 24, 28; 273/238; 714/48, 49, 52, 53, 54, 57

[56] References Cited

U.S. PATENT DOCUMENTS

| | | | |
|---|---|---|---|
| 4,372,558 | 2/1983 | Shimamoto et al. | 273/238 |
| 4,498,079 | 2/1985 | Ghosh et al. | 463/33 |
| 4,561,659 | 12/1985 | Redfield et al. | 463/33 |
| 4,570,930 | 2/1986 | Matheson | 463/41 |
| 5,623,603 | 4/1997 | Jiang et al. | 395/200.04 |

*Primary Examiner*—Jessica J. Harrison
*Assistant Examiner*—Sheila Clayton
*Attorney, Agent, or Firm*—Blakely, Sokoloff, Taylor & Zafman LLP

[57] ABSTRACT

The present invention is a method and apparatus for aligning information input by multiple users into a common reference frame. In the invention, a computer accepts an input causing an event in a reference frame. The computer generates a specific state and at least one abstract condition describing the event. The specific state and abstract condition describing the event is transmitted to a receiving computer. A receiving computer has a corresponding reference frame and determines whether moving to the specific state is consistent with the abstract condition transmitted when applied to the receiving computers corresponding reference frame. If moving to the specific state is not consistent with the abstract conditions, the receiving computer generates an alternative state which satisfies as many high priority abstract conditions as possible.

20 Claims, 6 Drawing Sheets

USING MULTIPLE PRIORITIZED STATEMENTS OF ABSTRACTED INTENTION TO ALIGN DIFFERENT VIEWS

BACKGROUND OF THE INVENTION

1. Field of the Invention

The present invention relates to a method and apparatus for aligning different view of a reference image. The present invention is particularly suitable for maintaining common characteristics in multiple views of a reference frame while each view of the reference frame undergoes editing on a respective computer.

2. Description of Related Art

Latencies or communication delays create problems in real time sharing of images that are being simultaneously changed at different user sites. The problem is particularly noticeable in distributed computing entertainment systems. In such a system where multiple users at different sites may be performing a real time interactive activity on a common image or reference frame, the communication delays can cause jerky or uneven movements unless very high speeds communication networks are used. Thus, traditional methods of solving the problem have been to increase the speeds of the communications lines and the computers on the communication line.

The most common place for interactive game playing is over the Internet. The traditional method of minimizing jerkiness and the slow responses of networked computers, is to use a fast modem and an Internet Service Provider (ISP) which is capable of quickly connecting the end user terminal to the Internet server. Some users, in order to further increase the speed of the communication link, dial directly into the Internet server.

A central computer is frequently needed to coordinate multiple users performing interactive activities on a common reference frame. For example, in games which run over the Internet, a central server usually runs the game. Thus a processor in the central server performs the computations and executes player movements. Even in such an arrangement, the latencies involved in transmitting and receiving the information from the various computers results in player movements that may be slow and jerky.

Thus, there exists a need for an improved method and apparatus for handling changes induced by multiple users sharing a common reference image.

SUMMARY OF THE INVENTION

The present invention is a system and method for aligning information. The method includes generating a specific state and at least one abstract condition describing a change event relative to a first view of a reference frame. The specific state and abstract condition(s) are transmitted to a receiving computer having a second view of the reference frame. The receiving computer determines whether moving to the specific state in the second view of the reference frame is consistent with the abstract condition(s).

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

A system is described which distributively processes changes received from various sources in related or common reference frames. In one embodiment, each reference frame is a data set on a computer system. In a typical application, the data set is displayed as an image on a computer display. In the invention, each computer in a network has a corresponding view of the reference frame which is independently manipulated. Although independently manipulated, the views of the reference frame must be closely related. The invention describes a system for coordinating the various views of reference frame such that only minor differences exist between the various views of the reference frames.

Traditional systems requires exact duplication of movements in related views of the reference frame. By allowing minor differences between views of the reference frame, each computer can control its own view of the reference frame allowing immediate execution of user inputs. The result of the user input on the computer is called an event. A transmitting computer transmits the specific state or changes which correspond to an event to receiving computers. The transmitting computer also generates and transmits abstract conditions describing the particular event.

Networked computers receive the specific state describing the event along with abstract conditions associated with the particular event. A receiving computer coordinates the event with inputs from other sources and accordingly amends a corresponding view of the reference frame in the receiving computer. In one embodiment, the specific state and abstract conditions are transmitted as data packets. Because multiple computers on a network may be transmitting multiple packets of data, each corresponding view of the reference frame in each receiving computer is constantly changing. The differences in the views of reference frame creates a problem in computer applications where strict synchronization of each view of the reference frame is required. However, for most applications where strict synchronization is not required, as long as the various views of reference frames are sufficiently coordinated, multiple users can work together toward an overall purpose. Furthermore, by allowing differences in the various views of the reference frame, processing of different events may occur on different computers allowing for distributed processing of changes.

In the following description, numerous references to specific details are set forth. In particular, many of the examples will focus on a game system with multiple users on a distributed computing system playing an interactive game. The example is used to provide a thorough understanding and enable clear presentation of the present invention. However, one skilled in the art will recognize many variations of the applicant's invention which may be practiced without the specific details. In particular, the invention may be used in all kinds of computer networks in which a shared global view must be coordinated between multiple users.

Figure 1:
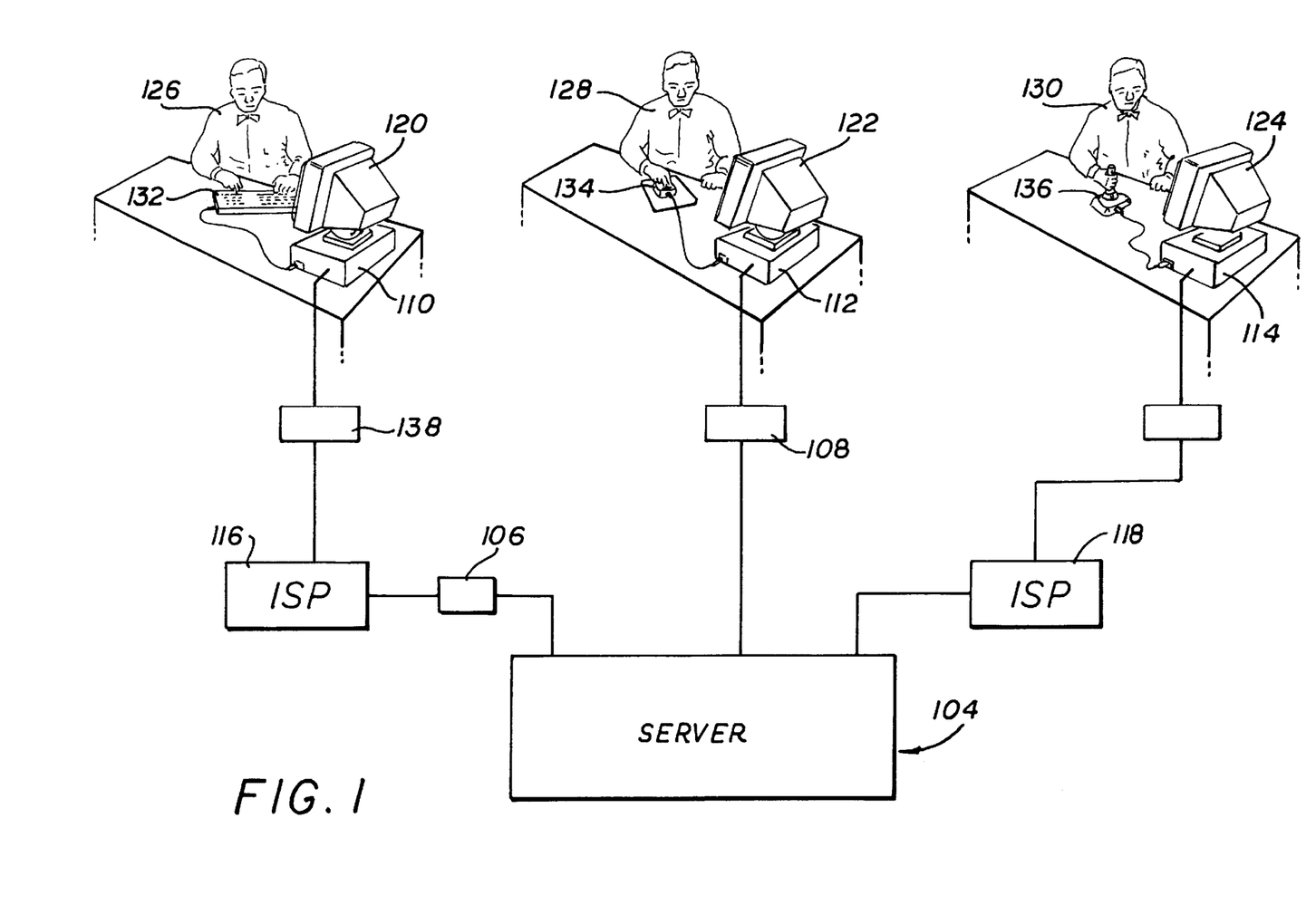
FIG. 1 is a diagram illustrating multiple users using an Internet system.

FIG. 1 illustrates an overall system utilizing the present invention. A server 104 coordinates the flow of information through routers 106, 108 to computers 110, 112, 114. Computer 112 may be directly connected to the server 104 providing the information. Other computers 110, 114 are connected to server 104 via Internet Service Providers (ISPs) 116, 118. Well known ISPs include on-line service providers such as America On Line, CompuServe, and Prodigy.

In the preferred embodiment of the invention a common computer program runs in a processor in each computer 110, 112, 114 to coordinate a networked entertainment software such as an interactive game. Each computer 110, 112, 114 includes a display devices 120, 122, 124 which displays a corresponding view of a reference frame. The display device may include but is not limited to liquid crystal displays, monitors, and plasma devices. In one embodiment, a central server is unnecessary to maintain a game state; instead, each networked computer maintains a view of a reference frame corresponding to the game state for the respective networked computer. Individual users 126, 128, 130 playing the game may input new information using various input devices including but not limited to a keyboard 132, a mouse 134, or a joystick 136. The data input by each user 126, 128, 130 must be adjusted and controlled such that each input results in an event in a reference frame which does not conflict with other events. By allowing each computer to accept immediate input from each user, the slow jerky movements resulting from communication latencies within a slower networked system, typically networks which use communication devices such as modems 138 coupled to ISPs 116, is minimized.

Figure 2:
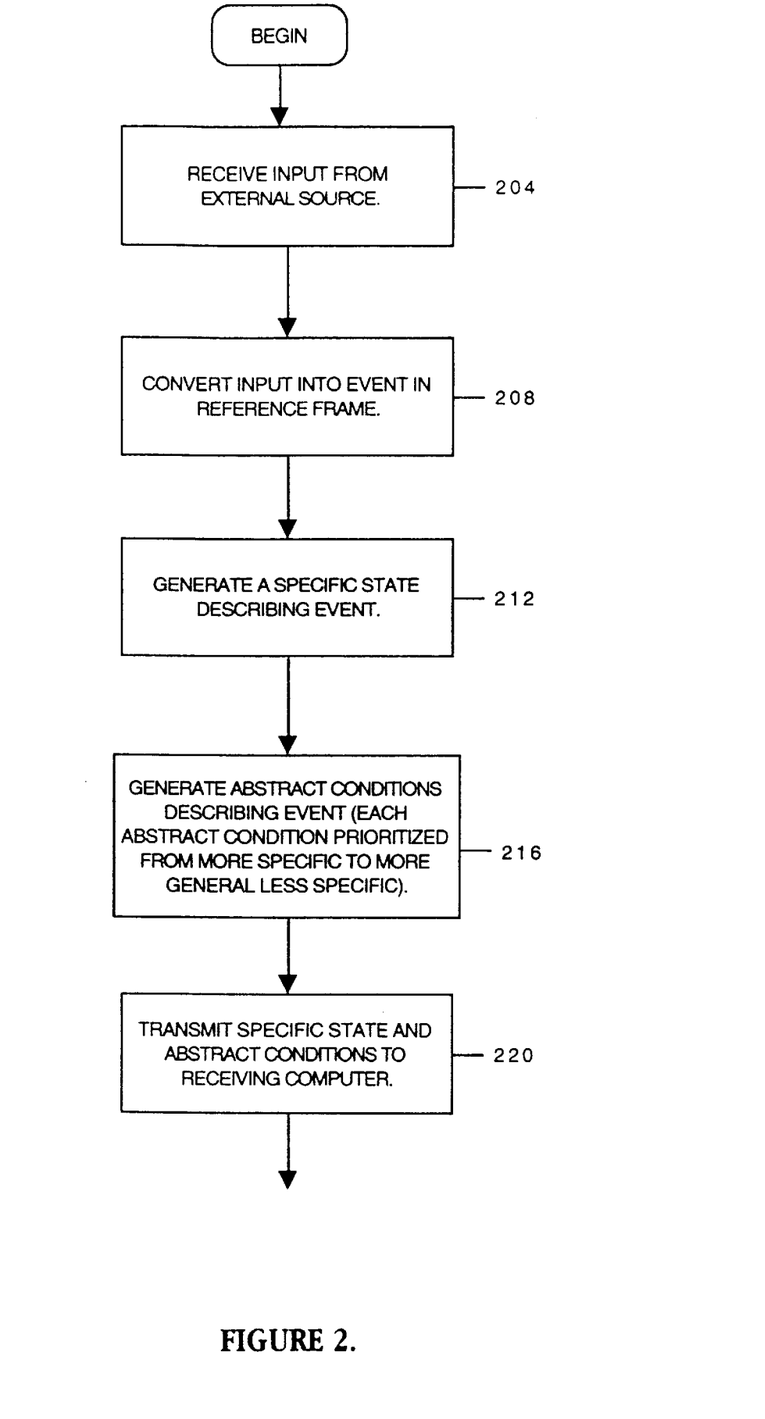
FIG. 2 is a flow chart illustrating a method of aligning different reference frames.

FIG. 2 illustrates a flow diagram of the steps used to implement the present invention. In step 204 the transmitting computer receives an input from a user or external source. The transmitting computer converts the input into an event, a change relative to a view of the reference frame, in step 208. The reference frame may be any set of data which defines a particular state. In the example, the reference frame is a game image on a computer screen illustrating player positions and objects with which the players interact. In step 212, the transmitting computer generates a specific state describing the event. An example of a particular specific state would be that a character moves from a particular coordinate ($X_1$, $Y_1$, in an XY axis reference frame to a second position coordinates $X_2$, $Y_2$).

In addition to generating a specific state describing an event, the transmitting computer also generates abstract conditions describing the event in step 216. If more than one abstract condition is generated for an event, the abstract conditions are prioritized. The abstract conditions are typically prioritized such that the most specific condition is assigned the lowest priority and more general conditions (less specific conditions) are assigned a higher priority. Thus, general or more "abstract" conditions are considered more important in describing an event. For example, the movement of a character from coordinates $X_1$, $Y_1$ to coordinates $X_2$, $Y_2$ is a very specific command and would have a lower priority than an abstract condition of "player strikes tiger" which is more general. The condition of a player striking the object might have a lower priority than an even more general or abstract condition that "player kills tiger". Thus a good abstract condition, also known as an abstracted intention, describes the occurrence of the event as well as the overall objective or intention of the party executing the event. These abstract conditions along with the specific state are transmitted to a receiving computer or receiving computers in step 220.

The receiving computer maintains a corresponding view of the reference frame similar to that of the transmitting computer. A receiving computer receives the information packet from the transmitting computer in step 224. In one embodiment, the information may be transmitted in packet form through a modem, an ISP, an Internet router and network to a server which then distributes the information to various receiving computers on the Internet. In a second embodiment, the computers are interconnected via a local area network (LAN) or other general computer network. The processing of each view of the reference frame may occur at the individual computer sites.

When the receiving computer receives the packet of information, it determines whether transitioning to the specific state in the corresponding view of the reference frame of the receiving computer satisfies the abstract conditions. In step 228, if it is possible to move to the specific state and still satisfy the abstract conditions, then the receiving computer transitions the corresponding view of the reference frame to the specific state in step 232.

If in step 228 it is determined that moving to the specific state will violate one of the abstract conditions, the receiving computer generates an alternative state which closely mimics the specific state in important features. In order to generate such an alternative state, the receiving computer chooses the lowest priority abstract condition (usually the most specific condition) and attempts to generate an alternative state which satisfies: 1) the chosen lowest priority abstract condition, 2) all associated higher priority abstract conditions and 3) a computer purpose or purposes associated with the particular program being run. In some embodiments, a computer purpose or overall computer purposes may not be used. One example of such a computer purpose may be to find a pot of gold or to slay an opponent in an adventure game. The alternative state may be chosen from a database of alternative states pre-loaded by the game designer in the game program files. Alternatively, the alternative states may be generated by the computer following patterns pre-programmed into the game software. If a satisfactory alternative state is generated in step 240, the receiving computer transitions the corresponding view of the reference frame to the alternative state in step 244.

When a receiving computer is unable to generate a satisfactory alternative state based on the chosen abstract condition, the receiving computer chooses the next lowest priority abstract condition which has not yet been analyzed in step 248. The receiving computer attempts to generate an alternative state for the chosen abstract condition in step 252. Again the computer attempts to find an alternative state satisfying the following conditions: 1) the chosen abstract condition, 2) all higher priority abstract conditions, and 3) the computer purpose or purposes if applicable. If, in step 256, it is determined that such a satisfactory alternative state can be generated, the receiving computer transitions the corresponding view of the reference frame to the alternative state in step 260. If such an alternative state cannot be found, the computer determines whether there are any higher priority abstract conditions in step 262. If there remains higher priority abstract conditions which have not been analyzed, the system returns to step 248 and chooses the lowest priority abstract condition which has not been analyzed. If all abstract conditions have been analyzed and an alternative state cannot be found, then the system may either transmit an error message or handle the error in a variety of different ways. One method of handling exhaustion of all abstract conditions which is shown in step 264 is to satisfy the common purpose of the programs being run on the various receiving computers.

The foregoing analysis may be clarified by describing the inventions use in an actual application, such as a game. By way of example, use of the invention is shown in FIG. 3.

Figure 3A:
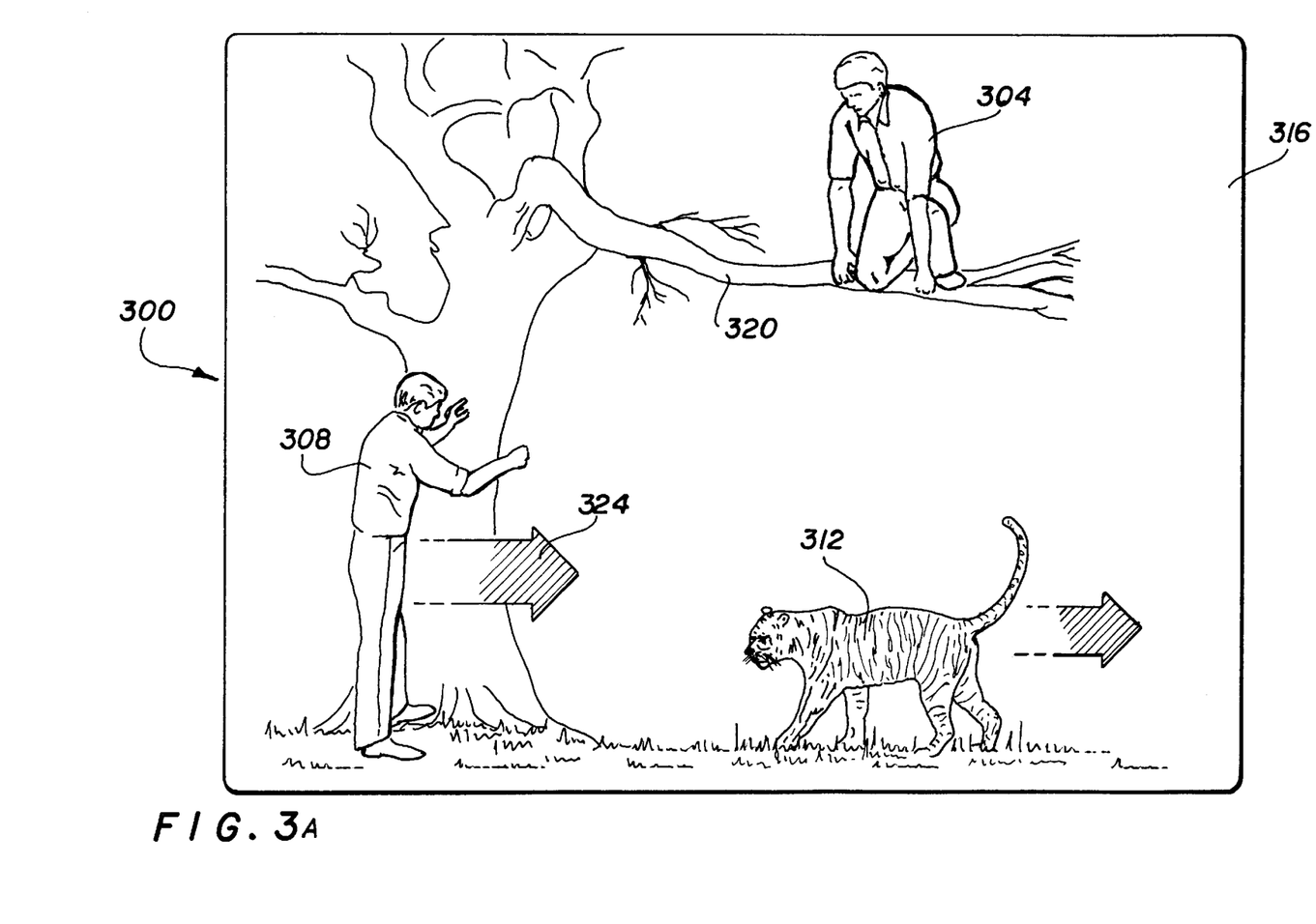
FIG. 3A and 3B illustrates two corresponding reference frames operating on different computer terminals.
Figure 3B:
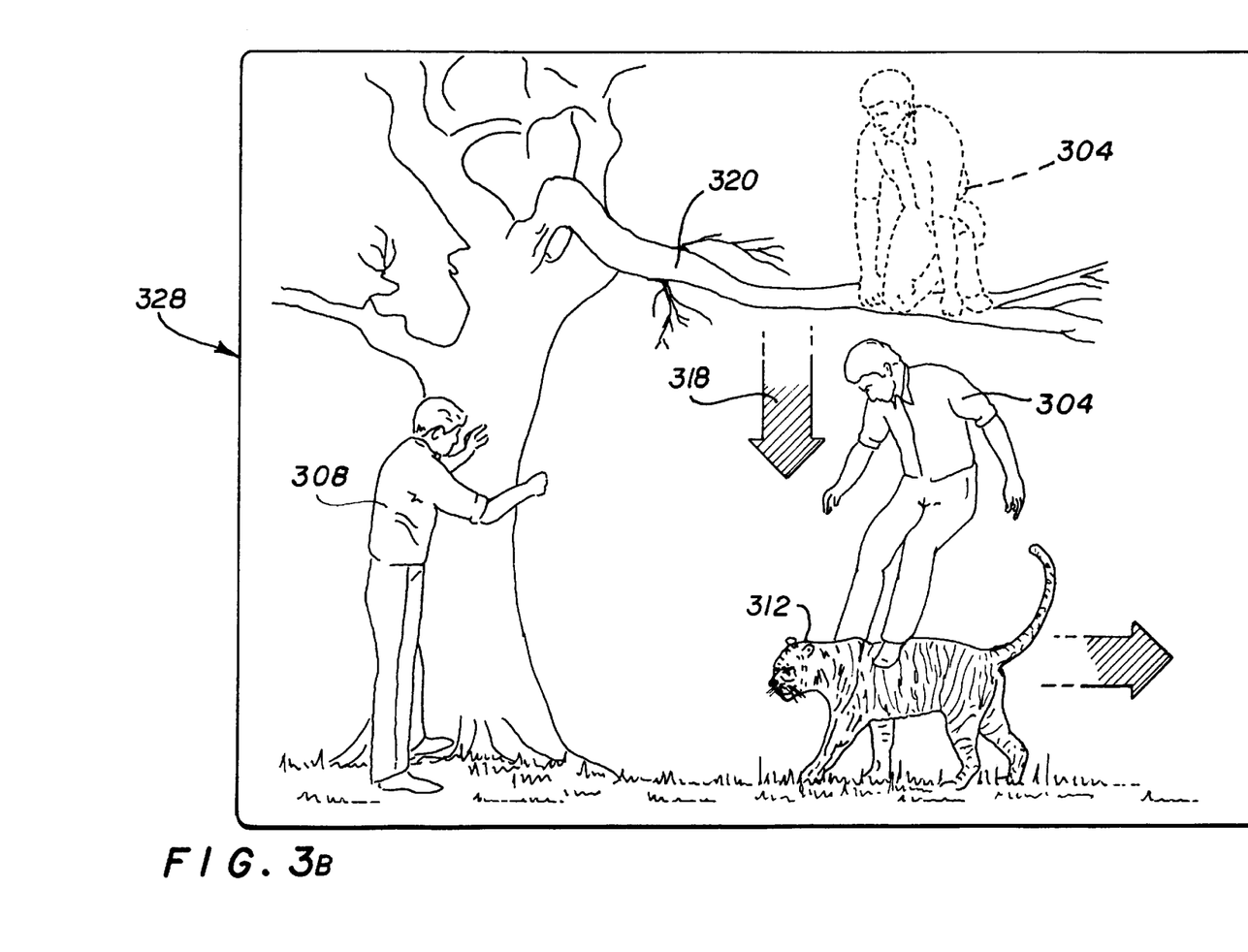

FIG. 3 illustrates two characters, player B 304 and player A 308 coordinating an attack on a tiger 312 in a video game display 316. In reference frame view A 300, player B 304 is supported by a tree branch 320. Player A 308 and player B 304 are simultaneously attacking tiger 312 on separate computer terminals. Player A 308 controlled by a first computer advances to the tiger 312 along the ground in a direction computer an arrow 324. In response, player A's computer which controls the tiger, moves the tiger backwards.

While a first player advances on the tiger 312 in reference frame view A, player B 304 starts to drop down in the direction of the arrow 318 on top of the tiger 312. Player B's drop occurs in a reference frame view B 328 controlled by a second player on a second computer (not shown). The movement of player A in the reference frame view A 300 and the movement of player B in the reference frame view B 328 occur very close in time. Thus, when player B's 304 drop from the tree branch 320 is received by the computer controlling player A 308, player A 308 has already advanced in the direction of arrow 324 and caused computer A to move the tiger backwards in the direction arrow 324. Thus a specific coordinate translation of player B's drop on top of the tiger in reference frame view B would appear in reference frame view A as a drop of player B on top of player A 308. Such a drop on top of Player A 308 is unintended and would greatly facilitate the tigers counterattack.

One method of solving the above described problem uses the current invention. The transmitting computer, (the computer of reference frame view B 328), transmits a packet of information describing player B's action such that the receiving computer, (reference frame view A) can approximate Player B's actions. The transmitting computer might include specific information describing player B 304 moves from a first $X_1Y_1$ coordinate supported by tree branch 320 to a second $X_2Y_2$ coordinate position on top of the tiger 312. Abstract conditions are also transmitted. An example of a set of abstract conditions include: 1) dropping out of a tree, and 2) landing on top of the opponent tiger 312. A still higher level of abstraction or more general abstract condition would be that player B 304 moves in closer proximity to the tiger 312. Finally, the over riding purpose of the game would be that the players capture the tiger 312.

When the data produced from reference frame view B 328 is received by the computer controlling the reference frame view A, the computer controlling reference frame view A 300 determines that the result of performing the specific XY coordinate translation would be that player B 304 lands on top of player A 308. Although the coordinate translation satisfies the specific condition of moving player B 304 to the $X_2Y_2$ coordinate and the lowest abstract condition of dropping player B out of the tree, the coordinate translation fails to satisfy the second priority abstract condition of landing player B on top of the opponent tiger 312. Thus, an appropriate alternative state generated by the computer might be to have player 304 leap from the tree at an angle to land on top of the tiger 312. The leap also satisfies the most abstract condition of moving in closer proximity to the opponent. Thus, in one embodiment of the invention the computer executes this alternative state.

It is recognized that the reference frame view A 300 and the reference frame view B 328 are not perfectly aligned after execution of the alternative state. However, at a higher level, both players will have advanced toward the overall purpose of the game, of capturing the tiger and the receiving computer's approximation of the action avoids the jerky and slow motion movement of the players. At the completion of the game, the tiger is captured, and the basic purposes and goals of the players will have been mutually achieved. At the games conclusion, the reference frame view A 300 will be approximately aligned with the reference frame view B 328. Since the conclusion of the game purpose occurs almost simultaneously, unless each player examines another players screen, the difference in reference frame views may go unnoticed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of aligning information comprising:
   generating a specific state and an abstract condition describing an event in a first view of a reference frame;
   transmitting the specific state and the abstract condition to a receiving computer having a second view of the reference frame; and
   determining whether moving to the specific state in the second view of the reference frame is consistent with the abstract condition.

2. The method of aligning information described in claim 1 further comprising:
   moving to the specific state in the second view of the reference frame when the determining step indicates that a move to the specific state is consistent with the description provided by the abstract state.

3. The method of claim 1 further comprising:
   calculating an alternative state consistent with the abstract condition and inconsistent with the specific state when the determining step indicates that a move to the specific state is not consistent with the description provided by the abstract state;
   moving to the alternative state in the second view of the reference frame.

4. The method of aligning a second event in a receiving computer reference to correspond to a first event in a transmitting computer view of a reference frame comprising:
   generating a plurality of abstract conditions describing the first event, each abstract condition in the plurality of abstract conditions having a different level of priority;
   transmitting the plurality of abstract conditions to the receiving computer;
   choosing as a chosen condition the lowest priority which can be satisfied in said plurality of abstract conditions while still satisfying conditions in said plurality of abstract conditions having a higher priority than the chosen condition; and
   adjusting the second event in the receiving computer reference frame to satisfy the chosen condition.

5. The method of claim 4 wherein the generating of the plurality of abstract conditions describes movements in an interactive game.

6. The method of claim 4 further comprising:
   adjusting the receiving computer view of the reference frame to accommodate a third event received from a transmitting computer.

7. The method of claim 6 further comprising:
   generating a second plurality of abstract conditions describing the third event; and
   transmitting the second plurality of abstract conditions.

8. The method of claim 4 further comprising:

matching the chosen condition generated by the choosing operation with an overall purpose shared by the transmitting computer and the receiving computer.

9. The method of claim 8 wherein the overall purpose being matched is the object of a game.

10. The method of claim 4 further comprising: setting a priority order such that the most specific abstract condition is assigned the lowest priority and the most general abstract condition is assigned the highest priority.

11. A machine implemented method comprising:

a. receiving a first specified state and at least one abstract condition describing changes to be made to a reference frame; and b. determining if it is appropriate to change a first view of the reference frame to the first specified state, using the at least one abstract condition; and c. changing the first view of the reference frame to the first specified state if step (b) determines changing the first view of the reference frame to the first specified state is appropriate.

12. The machine implemented method of claim 11, wherein step (b) further comprises determining an alternative state to change the first view of the reference frame if changing the first view of the reference frame to the first specified state was determined to be inappropriate; and step c) comprises changing the first view of the reference frame to the alternative state instead.

13. The machine implemented method of claim 11 wherein said first view of the reference frame and the second view of the reference frame are scenes in an interactive game.

14. The machine implemented method of claim 11 further comprising the step of:

determining if it is appropriate to change the first view of the reference frame to the first specified state, using a purpose.

15. The machine implemented method of claim 14 wherein the purpose described in the determining step is an object of a game.

16. An apparatus comprising a. a display device for displaying a first view of a reference frame;

b. an input device for providing inputs to change the reference frame;

c. a processing device coupled to the display and input devices for processing the inputs and changing the first view of the reference frame, and for generating a first specified state and at least one abstract condition to describe the change; and d. a communication device coupled to the processing device for sending the generated first specified state and at least one abstract condition to a second apparatus, the second apparatus to change a second view of the reference frame.

17. The apparatus of claim 16 wherein the processing device generates the first specified state by comparing a previous specified state with at least one prior abstract condition.

18. An apparatus comprising a. a display device for displaying a first view of a reference frame;

b. a communication device for receiving a first specified state and at least one abstract condition describing changes to be made to the reference frame;

c. a processing device coupled to the display and communication devices for processing the received first specified state and the at least one abstract condition, determining if it is appropriate to change the first view of the reference frame to the first specified state using the at least one abstract condition, and changing the first view of the reference frame to the first specified state if the change is determined to be appropriate.

19. A machine implemented method comprising:

a. receiving inputs that change a reference frame;

b. in response to the received inputs, changing a first view of the reference frame accordingly; and c. additionally, generating a first specified state and at least one abstract condition to describe the change, and sending the generated first specified state and the at least one abstract condition to another apparatus for use by the other apparatus to change a second view of the reference frame.

20. The method of claim 19 further comprises:

comparing the first view of the reference frame with a plurality of received abstract conditions to determine the validity of the first view of the reference frame.

* * * * *